(12) United States Patent
Dalal et al.

(10) Patent No.: US 10,965,701 B2
(45) Date of Patent: Mar. 30, 2021

(54) THREAT ACTOR IDENTIFICATION SYSTEMS AND METHODS

(71) Applicant: Proofpoint, Inc., Sunnyvale, CA (US)

(72) Inventors: Gaurav Mitesh Dalal, Fremont, CA (US); Hung-Jen Chang, Fremont, CA (US); Ali Mesdaq, San Jose, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 229 days.

(21) Appl. No.: 16/247,182

(22) Filed: Jan. 14, 2019

(65) Prior Publication Data
US 2020/0228551 A1  Jul. 16, 2020

(51) Int. Cl.
*H04L 29/06* (2006.01)

(52) U.S. Cl.
CPC ...... *H04L 63/1425* (2013.01); *H04L 63/1466* (2013.01)

(58) Field of Classification Search
CPC .................. H04L 63/1425; H04L 63/1466
See application file for complete search history.

(56) References Cited

U.S. PATENT DOCUMENTS

| 10,454,967 | B1* | 10/2019 | Zaslavsky | ........... H04L 63/1483 |
| 2007/0124582 | A1* | 5/2007 | Shannon | ............. H04L 63/1483 |
| | | | | 713/164 |
| 2014/0298460 | A1 | 10/2014 | Xue | |
| 2016/0006749 | A1* | 1/2016 | Cohen | ................ H04L 63/1425 |
| | | | | 726/23 |
| 2016/0241556 | A1 | 8/2016 | Jakobsson | |
| 2018/0007088 | A1 | 1/2018 | Kuznetsov | |
| 2020/0036750 | A1* | 1/2020 | Bahnsen | ............... G06N 20/00 |

FOREIGN PATENT DOCUMENTS

EP    3343872 A1    7/2018

OTHER PUBLICATIONS

European Search Report in Patent Application No. 19215273.4, dated May 28, 2020, 5 pgs.

* cited by examiner

*Primary Examiner* — Vance M Little
(74) *Attorney, Agent, or Firm* — Sprinkle IP Law Group

(57) ABSTRACT

A threat actor identification system that obtains domain data for a set of domains, generates domain clusters, determines whether the domain clusters are associated with threat actors, and presents domain data for the clusters that are associated with threat actors to brand owners that are associated with the threat actors. The clusters may be generated based on similarities in web page content, domain registration information, and/or domain infrastructure information. For each cluster, a clustering engine determines whether the cluster is associated with a threat actor, and for clusters that are associated with threat actors, corresponding domain information is stored for presentation to brand owners to whom the threat actor poses a threat.

18 Claims, 10 Drawing Sheets

| Seed | Domain | IP ASN | DNS IP Address | Registrant Email | Registrant Name | GA Tracker Id |
|---|---|---|---|---|---|---|
| ourbank.com | bustourbank.com | 12345 | 123.12.234.2 | abc123@999.com | 555net, Ltd. | |
| ourbank.com | nourbankebab.com | | | abc123@999.com | 555net, Ltd. | |
| ourbank.com | bourbank.com | | | abc123@999.com | 555net, Ltd. | |
| ourbank.com | gourbankeith.com | 12345 | 123.12.234.2 | abc123@999.com | 555net, Ltd. | |
| ourbank.com | yourbank.com | | | abc123@999.com | 555net, Ltd. | |
| ourbank.com | ourbankleholster.com | | | abc123@999.com | 555net, Ltd. | |
| ourbank.com | sourbank.com | 12345 | 123.12.234.2 | abc123@999.com | Acme Technology Inc. | |
| ourbank.com | gourbankites.com | | | abc123@999.com | 555net, Ltd. | |

FIG. 8A

| Seed | Domain | IP ASN | DNS IP Address | Registrant Email | Registrant Name | GA Tracker Id |
|---|---|---|---|---|---|---|
| ourbank.com | bustourbank.com | 12345 | 123.12.234.2 | | Acme Technology Inc. | |
| usabank.com | mnpbank.com | 12345 | 123.12.234.2 | person1@xyztech.com | Acme Technology Inc. | |
| ourbank.com | yourbank.com | 12345 | 123.12.234.2 | abc123@999.com | Acme Technology Inc. | |
| ourbank.com | ourbankuet.com | 12345 | 123.12.234.2 | person1@xyztech.com | Acme Technology Inc. | |
| ourbank.com | sourbank.com | 12345 | 123.12.234.2 | abc123@999.com | Acme Technology Inc. | |
| ourbank.com | ourbankieholster.com | 12345 | 123.12.234.2 | abc123@999.com | Acme Technology Inc. | |
| ourbank.com | nourbankebab.com | 12345 | 123.12.234.2 | abc123@999.com | Acme Technology Inc. | |
| ourbank.com | gourbankites.com | 12345 | 123.12.234.2 | abc123@999.com | Acme Technology Inc. | |

FIG. 8B

| Seed | Domain | IP ASN | DNS IP Address | Registrant Email | Registrant Name | GA Tracker ID |
|---|---|---|---|---|---|---|
| nationalbank.com | nationalbank-com-update-login.com | | | ADSADSAD@999.COM | SLOWDOMAIN, INC. | |
| nationalbank.com | nationalbank-com-login-support-alert-14-6.com | | | SDADSDSA@999.COM | SLOWDOMAIN, INC. | |
| nationalbank.com | nationalbank-com-login-woring-update-work.com | | | SDSKLDSF@999.COM | SLOWDOMAIN, INC. | |
| nationalbank.com | nationalbank-com-login-secure-sitkey-update.com | | | SDASAD@999.COM | SLOWDOMAIN, INC. | |
| nationalbank.com | nationalbank-com-support-update-19-5-2017.com | | | ASDSDADA@999.COM | SLOWDOMAIN, INC. | |
| nationalbank.com | nationalbank-com-system-new-update-new-year-2015s.com | | | DASDSSDAADS@999.COM | SlowDomain, Inc. | |
| nationalbank.com | nationalbank-com-update-info-login-new-sss.com | | | DSADSAD@999.COM | SLOWDOMAIN, INC. | |
| nationalbank.com | nationalbank-com-welcome0upgrade-info-system-login.com | | | DSAASDSAD999.COM | SLOWDOMAIN, INC. | |
| nationalbank.com | nationalbank-com-login-support-bussnis-gold.com | | | DSAAASDSDSDA999.COM | SLOWDOMAIN, INC. | |
| nationalbank.com | nationalbank-com-login-woring-update.com | | | DSSDAASDAS999.COM | SLOWDOMAIN, INC. | |
| nationalbank.com | nationalbank-com-login-update-unauthorized-uni.com | | | SDAAASD@999.COM | SlowDomain, Inc. | |
| nationalbank.com | nationalbank-com-login-atm-sign-in1.com | 54321 | 11.222.111.2 | ADADDSA@999.COM | SLOWDOMAIN, INC. | |
| nationalbank.com | nationalbank-com-upgrad-sign-in-account-onladine-seq.com | 54321 | 11.222.111.2 | SDASDADSASD@999.COM | SLOWDOMAIN, INC. | |

FIG. 8C

THREAT ACTOR IDENTIFICATION SYSTEMS AND METHODS

TECHNICAL FIELD

The invention relates generally to identification of threat actors in an online environment, and more particularly to systems, methods and products that enable systematic identification of threat actors that pose risks to a customer through actions such as highjacking traffic, delivering phishing schemes, selling knockoffs of the customer's products, stealing intellectual property, and the like.

BACKGROUND OF THE RELATED ART

It is very difficult problem to discover and associate threat actor targeting specific brand name automatically. Threat actors (persons or entities who attack the brands, domains emails, etc. of brand owners) can target single brand name or multiple brand names with similar attack techniques. A brand name can have one or more domain names.

A "domain name" generally may include an identification string that defines a realm of administrative autonomy, authority or control within the Internet. Domain names, which may also be referred to as "domains" herein, may be formed by the rules and procedures of the Domain Name System (DNS). Domain names are used in various networking contexts and application-specific naming and addressing purposes. In general, a domain name represents an Internet Protocol (IP) resource, such as a computer used to access the Internet, a server computer hosting a web site, or the web site itself or any other service communicated via the Internet.

Domain names may also be used as simple identification labels to indicate ownership or control of a resource. An example function of domain names is to provide easily recognizable and memorizable names to numerically addressed Internet resources. This abstraction may allow any resource to be moved to a different physical location in the address topology of the network, globally or locally in an intranet. Such a move may involve changing the IP address of a resource and the corresponding translation of this IP address to and from its domain name.

Additionally, domain names may be used to establish a unique identity. For example, organizations may choose a domain name that corresponds to their name (or brand), helping Internet users to reach them easily. In this context, a brand is a name, term, design, symbol, or other feature that distinguishes an entity (e.g., organization, product, etc.) from its rivals or competitors in the eyes of others (e.g., consumers). In order to confuse potential victims, attackers of computer systems may try to register domain names that are similar to a certain brand in order to confuse potential victims.

Email fraud is a relatively old and well known scam, in which someone spoofs a trusted identity in an effort to steal money or valuable information. Despite being well known, however, this scam is still pervasive. Email fraud attacks (sometimes referred to as business email compromise) steal billions of dollars from organizations around the world, and the frequency with which companies are being targeted continues to skyrocket.

Cybercriminals have figured out that tricking people, rather than technologies, is an approach that can yield high rewards. Although many organizations implement internal training and protocols aimed at protecting employees, people continue to fall for email scams. One recent survey found that 75% of organizations said they were targeted at least once by email fraud over the last two years, and 41% indicated being targeted multiple times. These numbers are getting worse, not better.

There are several fundamental reasons organizations haven't solved the problem of email fraud yet. One of the reasons is that attackers (threat actors) are targeting a wide range of people at all levels of the organization. While CEO-to-CFO spoofing attacks are prevalent, attackers are becoming more sophisticated, increasing the number of identities they take on (an average of 10) and the number of employees they target (an average of 13) within a given organization. The attackers are targeting people deeper within organizations and across more business functions.

Attackers commonly use an organization's brand and reputation to trick people into giving up something valuable. While the spoofed organization is not responsible for these attacks, they may still be blamed by the general public will for not preventing the attacks, potentially impacting the organizations' goodwill and bottom lines. More and more, criminals try to insert themselves into an organization's supply chain, posing as a partner or vendor, and asking for future payments to be made to fraudulent accounts. These partner spoofing attacks are difficult to detect and to prevent and are commonly discovered only when the business on the other end complains that they have not received payment.

Attackers have several tactics they can use to avoid being blocked. Display name spoofing (e.g., "Company <person@domain.com>") changes the visual cue of who the email is coming from. This can be stopped using dynamic email classification capabilities at the gateway. Domain spoofing (e.g., "Person <person@company.com>") hijacks an organization's trusted domain. This can be blocked by fully implementing DMARC email authentication on those domains. Lookalike domain spoofing (e.g., "Person <person@c0mpany.com>") uses lookalike domains that are registered by third parties and are outside of the control of the organization being spoofed. This tactic can be prevented by lookalike domain discovery solutions that detect, analyze and flag suspicious domains.

The frequency with which a given tactic is used varies quarter-by-quarter and from organization to organization. Conventional point products only solve for part of the email fraud challenge. For example, you could buy one product that would stop a domain spoofing attack targeting an organization's customers and a completely separate product that would prevent a display name spoofing threat aimed at a company's employees. The need to use separate point products also introduces security, compliance, and operational risks.

One of the problems that exists with current solutions is that it is very difficult to automate the process of discovering threat actors and associating them with specific brand names that are being targeted. This is due to a number of factors. For instance, threat actors can target either a single brand name or multiple brand names with similar attack techniques, and a brand name can have one or more domain names. Additionally, the threat actors may not be readily identifiable, because they may falsely identify their origins, they may use different domains or identifiers, they may be initiated through related but technically separate entities, or they may use other means to obscure their identities. Still further, identification of threat actors may be based on information associated with threats to only a limited number of targets (or even a single target), which increases the difficulty of the task. Conventional manual identification of threat actors is therefore often unreliable, inconsistent and subjective. Consequently, there is room for technical innovations and improvements.

SUMMARY OF THE DISCLOSURE

Embodiments disclosed herein provide systems, methods, and computer program products for systematically identifying threat actors in an online environment that pose risks to a customer through actions such as spoofing, highjacking traffic, delivering phishing schemes, selling knockoffs of the customer's products, stealing intellectual property, etc.

One embodiment comprises a threat actor identification system having a computer that includes at least one processor and at least one non-transitory computer-readable medium storing instructions that are executable by the processor to perform the following steps. The system first obtains domain data for a set of domains that may be associated with threat actors, brand owners, or benign entities. The data may be obtained from one or more data sources that are communicatively connected to the computer by a network, or it may be retrieved from a data storage device in which previously collected data has been stored. The domain data has information associated with each of the domains, and may include an identifier of one or more corresponding brands with which the domain is associated (e.g., brands for which the domain poses a threat), as well as web page content associated with the domain, domain registration data for the domain, and/or infrastructure data for the domain. The system examines the obtained domain data and generates domain clusters based on the examination of the obtained domain data. Each domain cluster includes a corresponding subset of the domains in the examined set of domains, where the domain cluster is determined based on computed similarities with others of the domains in the subset. The system then determines, for each of the generated domain clusters, whether the domain cluster is associated with a threat actor. The determination may involve determining a degree of the associated threat (e.g., the cluster may be determined to be associated with a threat actor, or it may simply be identified as suspicious without rising to the level of a threat actor. The system then identifies, for each of the generated domain clusters that is associated with a threat actor, the brand owners associated with the threat actor. The system then provides an indication of the threat actor (e.g., domain data for the domains in the cluster associated with the threat actor to the brand owners via the brand owners' client devices which may be communicatively connected to the system by a network.

The threat actor identification system may be configured to generate the domain clusters by examining various types of domain data, determining similarity values indicative of similarities between individual ones of the plurality of domains, and generating domain clusters based on the similarity values. The generation of the domain clusters may be based on, for example, web page content, domain registration data, and/or infrastructure data for the domains. In one embodiment, generating the domain clusters involves two separate clustering processes. In a first, serial one of the clustering processes, the system serially performs generation of the clusters based on web page content, then domain registration data, and then infrastructure data. In a second, parallel one of the clustering processes, the system performs generation of the clusters based on web page content, domain registration data, and infrastructure data in parallel. In one embodiment, the system is configured to determine whether the domain cluster is associated with a threat actor by checking several features or conditions associated with the clusters. In this embodiment, the cluster is determined to be associated with a threat actor if: the domain cluster has more than a predetermined number of members; and one of the members has been registered within the last three months; and phishing keywords are contained inside a domain name of one of the members or the domain name of one of the members has any associated threat activity; and if one of the members has HTTP status 200, or one of the members has one or more IP addresses, or one of the members has an MX-record association. If these conditions are true, the domain cluster is determined to be associated with a threat actor and is stored. Otherwise, the domain cluster is determined not to be associated with a threat actor and is not stored. The system may identify the brand owners associated with the threat actor by identifying the members of the domain cluster associated with the threat actor and identifying, for each of the members of the domain cluster, the brand owners associated with the member. The system may identify the threat actor to the associated brand owners by: for each of the one or more brand owners associated with the threat actor, providing domain data for the members of the domain cluster associated with the threat actor, where the domain data may include web page content of the member, domain registration data for the member, and/or infrastructure data for the member.

An alternative embodiment may comprise a method for identifying threat actors using domain data, where the method includes the steps described above in connection with the threat actor identification system. Another alternative embodiment may comprise a computer program product having a non-transitory computer-readable medium that stores instructions which are translatable (executable) by a processor to perform the steps described above in connection with the threat actor identification system. Numerous other alternative embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

Embodiments disclosed herein can provide many technical advantages, as current network (e.g., internet) users do not have viable detection techniques for detecting activities (e.g., phishing and/or domain name spoofing) of potential cyber threat actors. Embodiments disclosed herein can fill this void in an effective and proactive manner, providing users and brand/domain owners a technical solution to preemptively identify domains that may be relevant, or not relevant, to particular brand names. Embodiments of the present invention may, for example, collect and analyze across an industry to enable identification of threat actors based on an increased pool of data that would not be available to a single brand owner. Further, embodiments disclosed herein may provide the systematic identification of threat actors based on similarities in a variety of different types of domain data (e.g., domain registration information, domain infrastructure information, and web page content) that enables the proactive identification of threat actors before these actors take action with respect to a customer.

Further, these embodiments may provide means to objectively identify threat actors through similarities in domain data, rather than relying on subjective manual analysis of potential threat actors.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 8A-8C are examples of domain data that may be presented to customers associated with identified threat actors in accordance with one embodiment.

DETAILED DESCRIPTION

Figure 1:
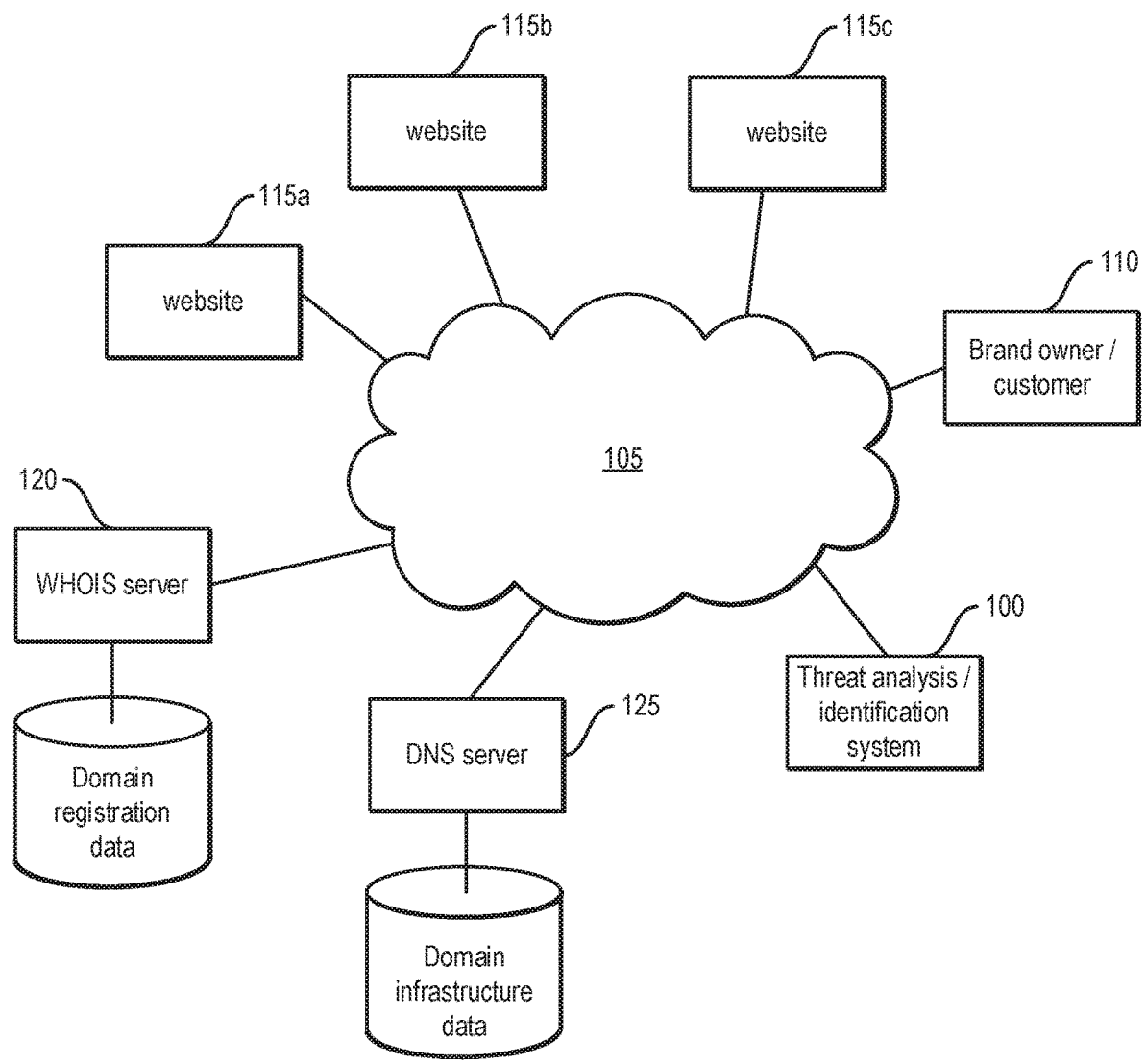
FIG. 1 is a diagram illustrating an exemplary embodiment of the invention which is implemented in an internet environment.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Threat actors may use a variety of tactics to target brand owners online. These tactics may include spoofing, highjacking traffic, delivering phishing schemes, and various others. Conventional web browsers do not implement very advanced techniques to detect improperly named or "spoofed" domains. A web browser typically does not detect whether a domain name may appear to be similar to, but possibly totally irrelevant to, another domain name. Instead, any time a domain is determined to be malicious (whether manually by a programmer or programmatically by a machine), it may be added to a "black list" of domains. It does not matter whether its domain name is actually relevant to a brand name or not.

Domain names can be attacked in many ways. For example, in a type of domain name attack referred to as typosquatting, a domain name that looks similar to a more established domain name may be used to deceive or fool a user. A typosquatting domain name may be a variant of the more established domain name. For example, a slight change such as a capital case of "I" or "1" may be used instead of a lower case "l"; a hyphen may be added; a small typo may be introduced; an extra character may be omitted or added; or the number "0" may be used instead of a lower case "o"—the variations can be limitless.

As discussed above, attackers of computer systems may try to register domain names that are similar to those operated by a brand (e.g., Apple®, Microsoft®, etc.), in order to confuse potential victims. Attackers may employ these tactics for several reasons. For example, the similar domain names may provide more credibility to spoofed domains in the eyes of potential victims. Further, spoofed domain names that contain the brand name exactly (e.g., as a substring within the spoofed domain name) may be less difficult for monitoring services to find and shut down. By creating domain names with related terms (i.e., terms that may be related to the brand name), attackers may include only an approximate match to the brand name and manage to evade detection, while the approximate match may still appear to be familiar to potential victims.

Another problem in detecting potential spoofed domains is that, when relying on exact and approximate match to a brand name in order to detect the potential spoofed domains, legitimate domains that are unrelated to the brand but whose name still include a match to the brand name may be encountered. For example, a brand name such as ING™ may be short. Any domain name that includes a present participle (e.g., "going", "laughing", "eating") would also include an exact match for "ing", and could mistakenly be suspected of malicious activity.

Potential attackers may also try to increase their credibility by, for example, including auxiliary terms in the domain name that are associated with the brand, but not derived from the brand name. This may be referred to as domain name engineering or domain name "social engineering." For example, a spoofed domain name for a bank might also include the words "financial" or "investment", or a spoofed domain name for a brand could include other trademarks of the brand. For example, "apple-account-login.com" may be detected as having "Apple" as a substring, "chase-investment-center.com" may be detected as having "Chase" as a substring, and "icloudupdate.com" may be detected as having "iCloud" as a substring.

Another related problem is that, when detecting potential spoofed domains by looking for those that contain the brand name as a substring, legitimate domains may be encountered that are unrelated to the brand, but whose name still includes the brand name as a substring. This may occur when the brand name has more than one definition. For example, Apple is a fruit as well as a brand name, and any domain name referring to the fruit, such as "appleorchard.com", would also include an exact match for the brand name Apple®. In other examples, "purchaseparty.com" may not be detected, although it has "Chase" as a substring, "apple-farms.com" may not be detected, although it has "Apple" as a substring, and "worldbankmarijuana.com" may not be detected, although it has "WorldBank" as a substring.

Suppose "Company.com" is an established domain for a famous "Company" and "my.company.com" is a spoofing/phishing site. A web browser will not know that the second domain may be completely irrelevant to the first domain name. There is no intelligence in the web browser's function—it will respond to a user selecting a link, resolve that link to a network resource IP address, render the network resource (e.g., a web page), and display the rendered document. If the web browser determines that "my.company.com" is a phishing site, for example, by referencing its black list (into which the site must have been previously added), then the browser may inform the user that the site does not seem to be legitimate. By this time, the web browser may already begin loading the page from the phishing web site "my.company.com" and/or the potentially malicious software may have already been downloaded onto the user's computer.

Threat actors may target specific brands or brand owners, or they may target multiple legitimate brand owners, typically within a particular industry. For instance, a threat actor may target a single banking institution such as Wells Fargo, or it may target a range of banks, such as Wells Fargo, Bank of America, Chase, etc. Commonly, these threat actors are associated with one or more domains to carry out their attacks on the brand owners. Embodiments of the present invention may use several different types of information to identify clusters of related domains, which are then analyzed to determine whether the clusters are associated with threat actors. Any clusters that are determined to pose a risk to particular brand are identified to the brand owners so that they can implement protections against the represented threat.

Referring to FIG. 1, a diagram is provided to illustrate an exemplary embodiment of the invention which is implemented in an internet environment. In this embodiment, a threat analysis system 100 is communicatively connected to the internet 105 to identify potential threats to a customer site 110 that is also connected to the internet. The threats to customer site 110 may be posed by threat actors that use various web sites 115 that are also connected to the internet, or domains for these web sites.

Threat analysis system 100 is configured to collect data for the various web sites and domains. Information is collected for both legitimate sites and those that may be associated with threat actors. The information may include web content that is contained in the pages of the web sites 115, domain registration information (e.g., from WHOIS server 120), and infrastructure information (e.g., from DNS server 125) that is associated with the web sites. The information that is obtained by a data collection subsystem is stored in a database. The database is then accessed by a threat analysis subsystem which is accessible by a threat analysis in order to identify groups or clusters of domains that are related to each other. The relationships between the domains may be embodied in one or more of the different types of information that are collected and stored in the database (web content, domain registration information and infrastructure information). The clusters of related domains are then analyzed to identify which of the clusters may be associated with threat actors. If a cluster is associated with a threat actor, information on the cluster is stored so that it can be provided to any clients that are registered with the system.

Figure 2:
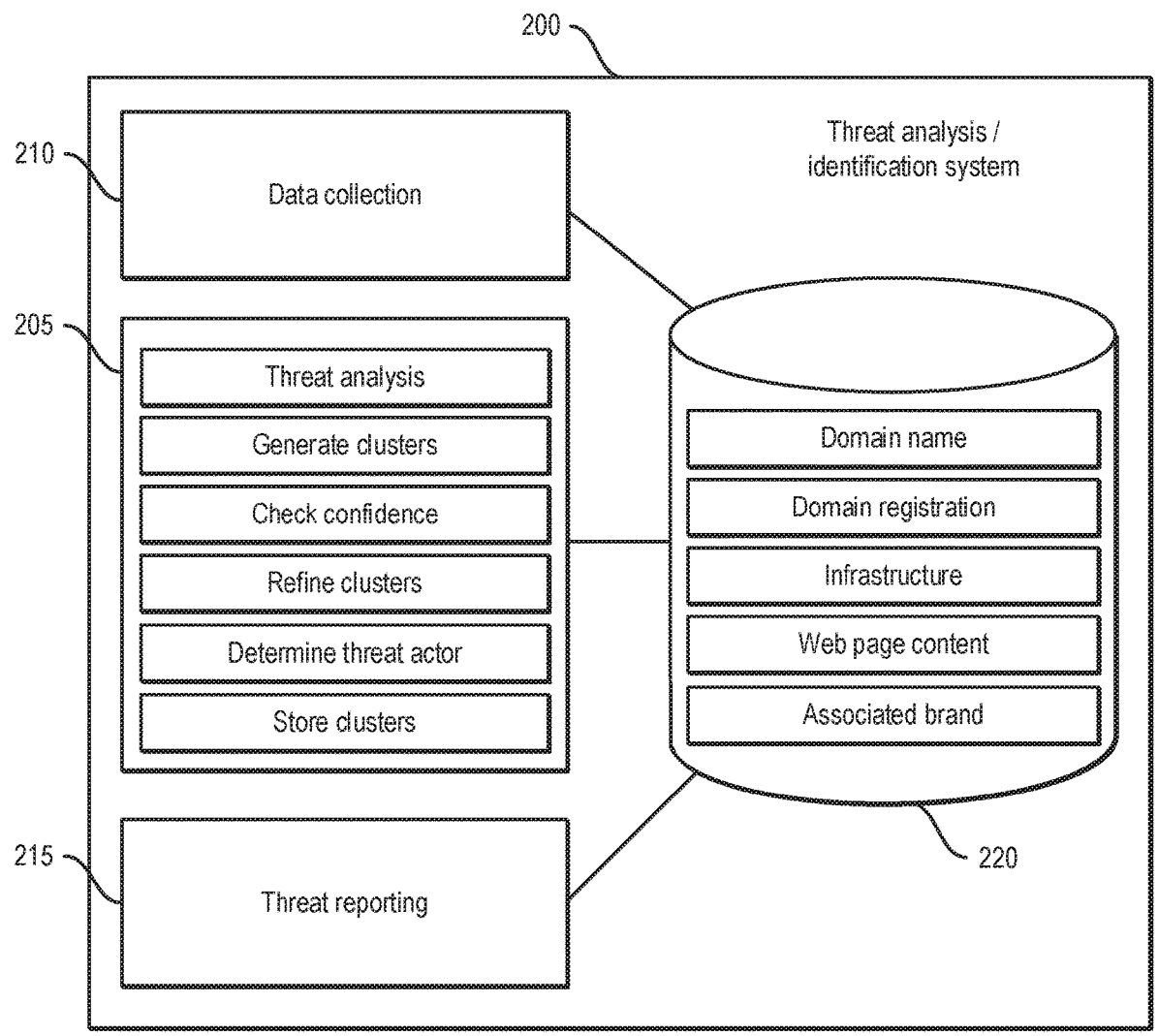
FIG. 2 is a diagram illustrating the components of a threat analysis and identification system in accordance with one embodiment.

Referring to FIG. 2, a diagram illustrating the components of the threat analysis system in one embodiment is shown. In this embodiment, threat analysis system 200 includes a threat analysis subsystem 205, a data collection subsystem 210, a threat reporting subsystem 215 and a data storage 220.

Data collection subsystem 210 is configured to collect data from several different information sources, including domain registration information sources, infrastructure information sources, and the web sites of the domains themselves. Domain registration information sources provide administrative information relating to domain registrations. For example, the domain registration information may include contact information for the registrant, an administrative contact and a technical contact. The contact information may include, for example: Name; Organization; Mailing Address; Phone; Fax; and Email. The domain registration information may also identify the domain registrar that registered the domain and the corresponding WHOIS server's URL, the date the domain was registered, and the status of the registration. Still other information may also be available.

Data collection subsystem 210 may collect domain infrastructure information from sources such as DNS servers. This infrastructure information may include, for example, the DNS IP address of a domain, which is a numerical label assigned to each device in a computer network that uses the Internet Protocol for communication. The infrastructure information may also include the autonomous system number (ASN) that is associated with the IP address. The ASN is a unique number assigned to an autonomous system by the Internet Assigned Numbers Authority (IANA). Various other types of infrastructure information may also be collected.

Data collection subsystem 210 may also collect web content from the web pages of web sites associated with the different domains. Data collection subsystem 210 may collect this content by accessing web pages of different web sites, examining the HTML code of the retrieved pages, and extracting and storing particular pieces of content that may be relevant to the clustering or analysis of the domains. For example, many web pages include tracker IDs that allow tracking of clicks, registrations, impressions, and conversions that originate from the corresponding site. Related domains may use the same tracker ID, so this information may be useful in identifying clusters of domains that are suspicious or that present a threat to a customer.

The data collected by data collection subsystem 210 is stored in a database in data storage 220. The database includes a record for each different domain. The database includes records for thousands or even millions of different domains. These domains may include those owned by customers or brand owners, threat actors, or other, benign entities who are unrelated to either the customers or the threat actors. Each record includes information identifying the corresponding domain and associated domain registration and infrastructure information and web content. Each record may also include one or more indicators of brands or brand owners with which the domain is associated. The brand or brand owner indicators may, for instance, indicate an entity for which the domain is considered a threat actor. As an example, wellsfargoo.com may be considered a threat actor with respect to wellsfargo.com, so wellsfargo.com may be identified in the record for wellsfargoo.com.

After the information on the domains has been collected and stored in the database in data storage 220, the database is accessed by threat analysis subsystem 205. Threat analysis subsystem 205 includes components that are configured to: generate clusters of domains; check a confidence level associated with each of the generated domains; fine tune (e.g., split or merge) the clusters; determine whether each of the resulting clusters represents a suspicious entity or threat actor; and store any of the clusters identified as suspicious entities or threat actors in data storage 220. The identified clusters (or identifying information) may be stored separately from the original database of collected information, or they may be flagged in the original database. A threat reporting subsystem 215 may access the identified clusters or corresponding information to determine which customers or brand owners are associated with the domains in the respective clusters. One or more customers or brand owners may be associated with each cluster. The threat reporting subsystem may then make information associated with each cluster available to those customers or brand owners that are associated with the cluster.

Figure 3:
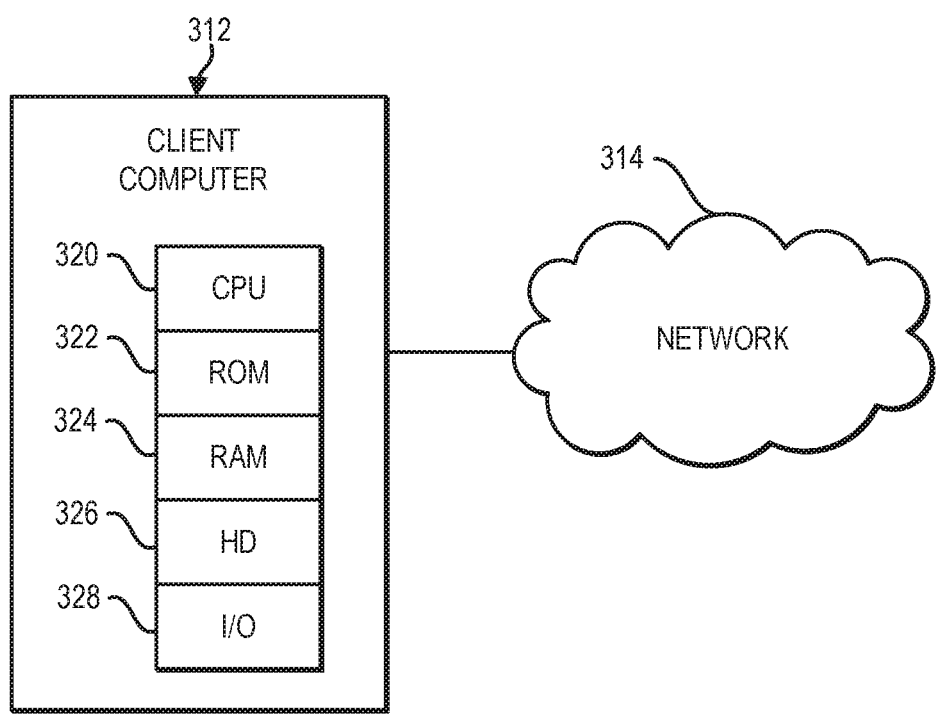
FIG. 3 is a diagram illustrating an exemplary computing system that can be used to implement embodiments of the threat analysis and identification system, as well as other computing systems that may be described herein.

Threat analysis system 200 may be implemented in one or more computers or computing systems. An exemplary computing system that can be used to implement the threat analysis system or others of the systems described herein is illustrated in FIG. 3. For the purpose of illustration, a single computer 312 is shown, although alternative embodiments could use multiple computers or a distributed computing environment. Computer 312 is connected to a network 314 such as the internet so that the computer can communicate with customer computing systems, domain registration servers, DNS servers, web sites and any other devices that may be connected to the network. Network 314 may represent a combination of wired and wireless networks.

Computer 312 can include central processing unit ("CPU") 320, read-only memory ("ROM") 322, random access memory ("RAM") 324, hard drive ("HD") or storage memory 326, and input/output device(s) ("I/O") 328. I/O 329 can include a keyboard, monitor, printer, electronic pointing device (e.g., mouse, trackball, stylus, etc.), or the like. Computer 312 can, as appropriate, include a desktop computer, a laptop computer, a personal digital assistant, a cellular phone, or nearly any device capable of communicating over a network.

The computer in FIG. 3 may have more than one CPU, ROM, RAM, HD, I/O, or other hardware components. For the sake of brevity, the computer is illustrated as having one of each of the hardware components, even if more than one is used. Computer 312 is an example of a data processing system. ROM 322, RAM 324, HD 326, and data store 318 can include media that can be read by CPU 320. Therefore, these types of memories include non-transitory computer-readable storage media. These memories may be internal or external to computer 312.

Portions of the methods described herein may be implemented in suitable software code that may reside within ROM 322, RAM 324, or HD 326. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Figure 4:
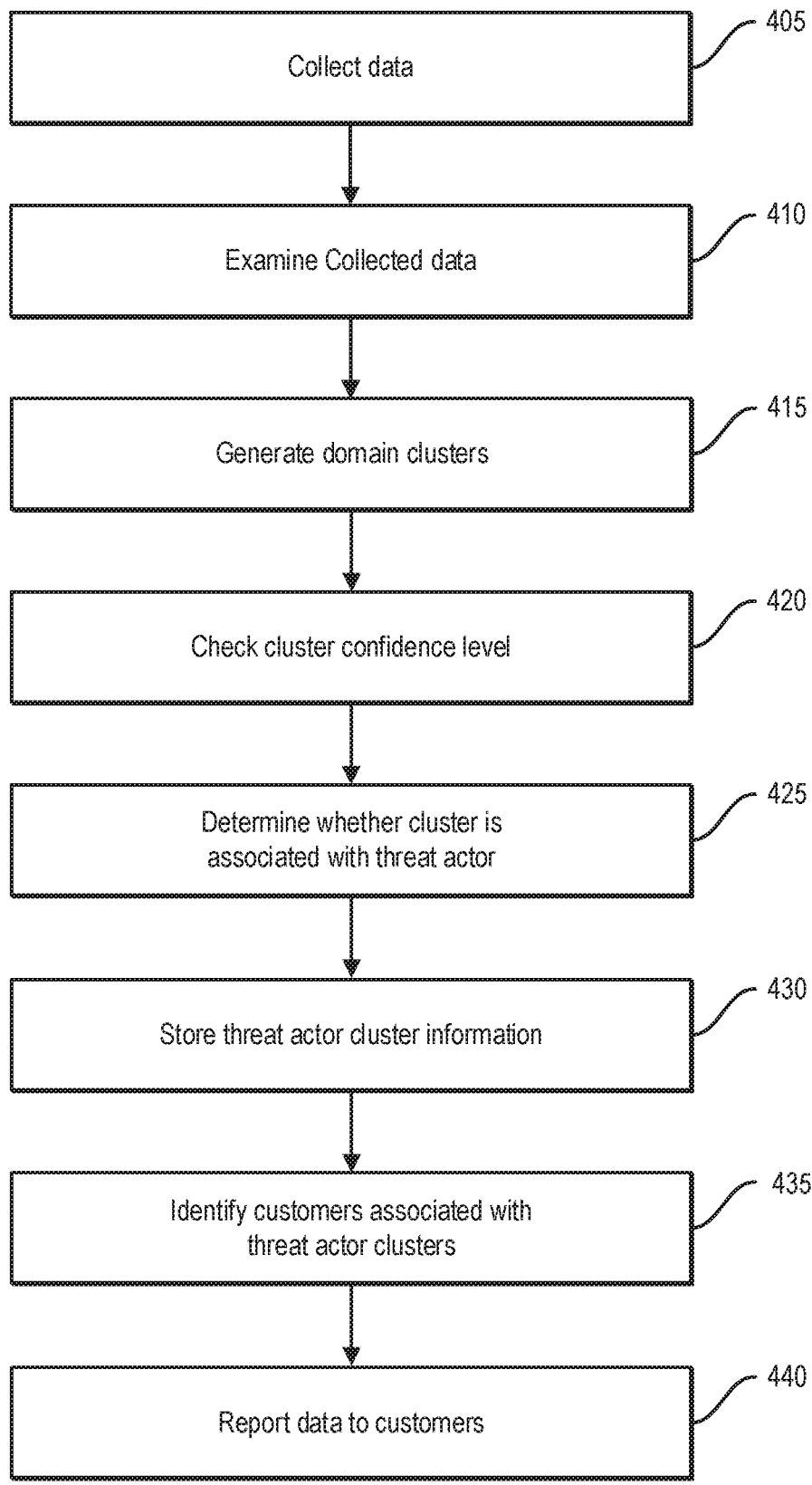
FIG. 4 is a flow diagram illustrating an exemplary method that can be implemented by a threat analysis system in accordance with one embodiment.

Referring to FIG. 4, a flow diagram illustrating an exemplary method that can be implemented by the threat analysis system in one embodiment is shown. In this embodiment, the data for a set of domains is collected (405). The set preferably includes all available domains. As noted above, the collected data may include the domain name, corresponding domain registration and infrastructure information, content extracted from web pages of the domain, and an identifier of the customer(s) with which the domain may be associated. After the data for the domains has been collected, the stored information is examined (410). In one embodiment, the system examines domains that are relevant to a particular industry, as threat actors commonly target multiple brands within an industry, and the examination of the domain information across multiple brands allows correlations to be made that would not be possible if only the information relating to a single brand were examined. ("Brand" should be construed herein to include trademarks, entity names, domain names, or other names or words that may be considered to be the property of an entity, which may itself be referred to herein as a brand owner.)

As the system examines the data for the domains, it generates clusters (415). The clusters are formed by matching data for the different domains. For instance, one domain may be clustered with another if both domains have the same domain registrant, or IP address, or tracker ID. In one embodiment, the system clusters the two domains if there is a match of a primary feature as well as a similarity (though not a strict match) of a secondary feature). The generated clusters may each include two or more domains. After a cluster is generated in this embodiment, a confidence check is performed on the cluster (420). The confidence check is generally a statistical analysis of the respective feature values to determine a measure of the similarity (a "distance") between them. If the cluster is determined to have a similarity that exceeds a threshold (which may vary from one embodiment to another), the cluster is confirmed and is forwarded to a clustering engine. The clustering engine performs an analysis of the received clusters to determine whether the cluster represents a threat (425). The threat may be a low-level threat which justifies classification of the cluster as a "suspicious" cluster, or it may be a higher-level threat which justifies classification of the cluster as a threat actor. If the cluster is classified as suspicious, or as a threat actor, the cluster is stored for reporting (430).

As noted above, the domain information includes an associated brand owner. The stored clusters are examined to identify the brand owners that are associated with the domains in the suspicious or threatening cluster (435). There may be only a single brand owner that is identified, or there may be multiple brand owners. For each of the brand owners that is identified as being associated with a cluster, and that is a customer of the system, the information for the domains in the cluster is made available to that brand owner (440). The information may be pushed to the customer, or it may be stored in the system in such a manner that access to the data by the associated customer is enabled.

In one embodiment, the system uses two similar workflows to identify threat actors that may pose a risk to brand owners. A first one of the workflows identifies clusters by serially examining different types of domain data, and the other workflow identifies clusters by examining the different types of domain data in parallel. These workflows are illustrated in FIGS. 5 and 6.

Figure 5:
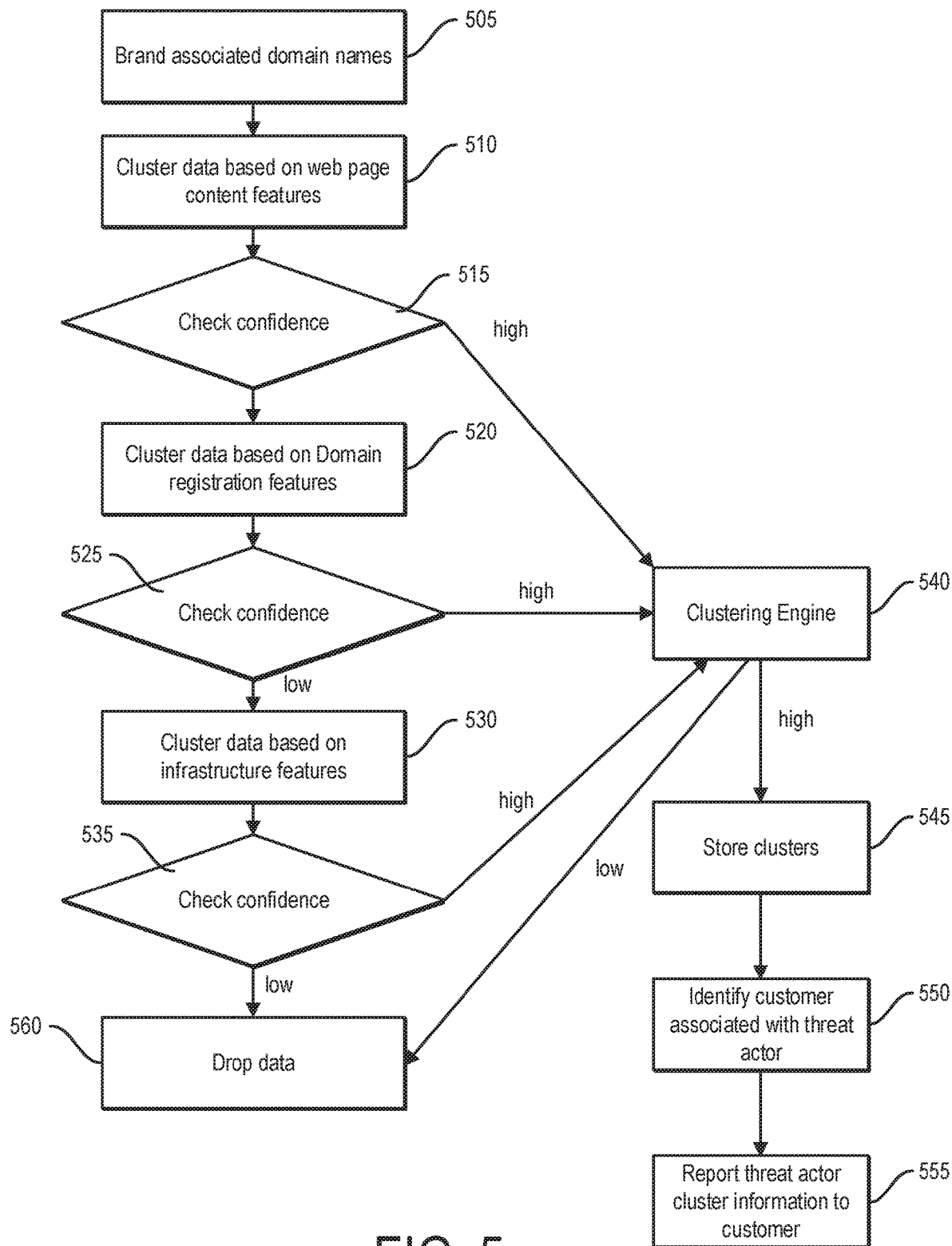
FIG. 5 is a flow diagram illustrating a serial workflow in accordance with one embodiment.
Figure 6:
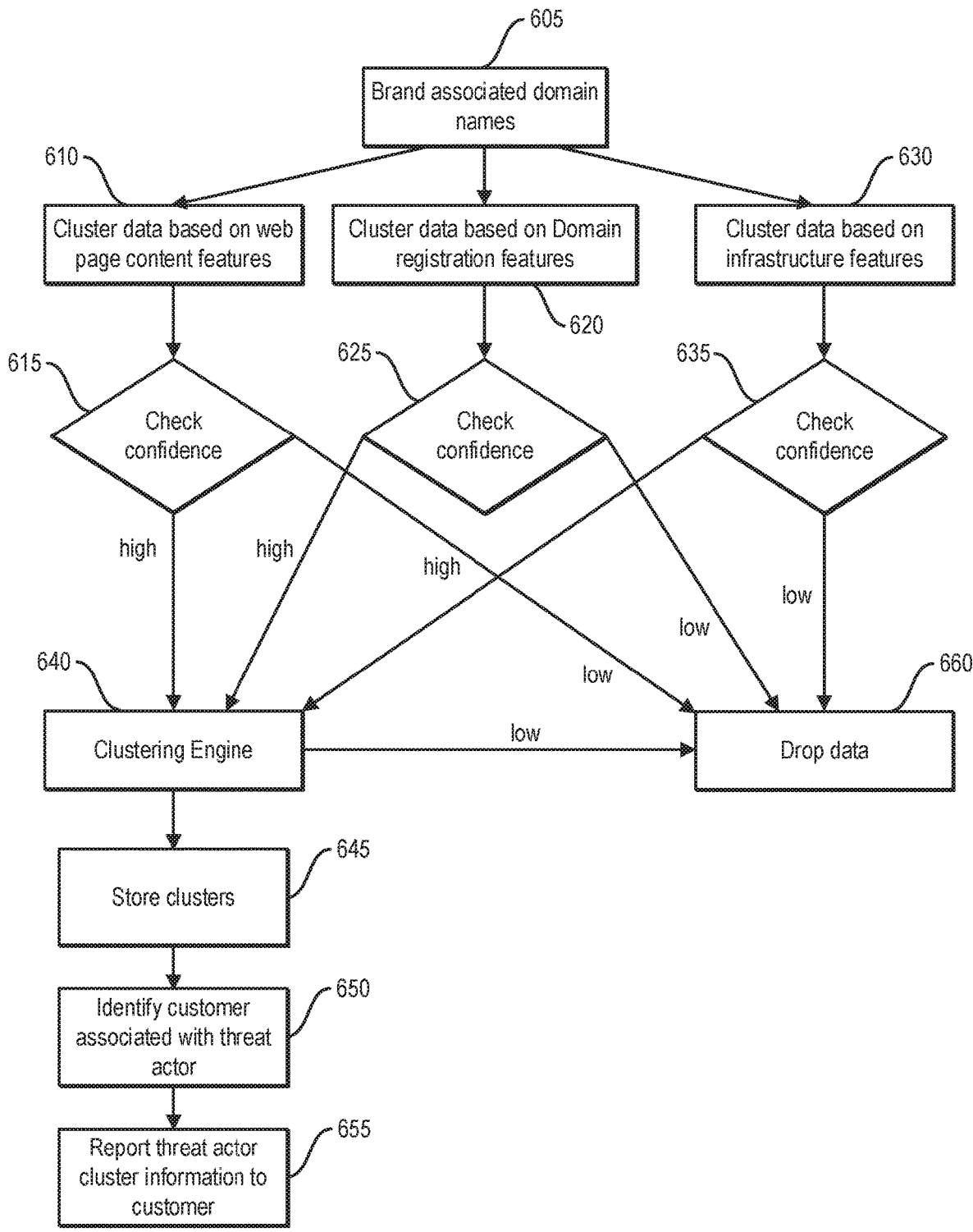
FIG. 6 is a flow diagram illustrating a parallel workflow in accordance with one embodiment.

Referring to FIG. 5, a flow diagram illustrating a serial workflow in accordance with one embodiment is shown. Initially, domain data associated with a set of domains is provided to the system (505). The domain data includes information associated with many different domains, some of which may associated with threat actors, others which may be associated brand owners, and still others which may not be associated with either threat actors or brand owners. As noted above, the domain data commonly includes domain registration information, domain infrastructure information, and actual content from webpages associated with the respective domains.

The domain data is first examined in this embodiment with respect to web content, and domains are clustered based on their web content (510). In one embodiment, the web content stored for each domain includes web trackers or tracker IDs that are incorporated into the web pages of the domain. In this embodiment, the system may cluster (group together) domains that have the same tracker ID incorporated into their respective web pages. A confidence check is then performed on the clusters that are formed based upon web content (515). The confidence check is a statistical analysis of the clusters to determine whether the domains that are included in each cluster are sufficiently similar to each other that they should be retained in the cluster. In one embodiment, this involves determining a vector associated with each domain and then computing values for the similarity between pairs of the domains. If the similarity value for a pair of domains is above a threshold value, the pair are retained in the same cluster. If not, one of the pair may be removed from the cluster. Various other types of statistical analysis may be performed in alternative embodiments.

"Vector", as used here, refers to a set of values corresponding to a set of features or characteristics for a domain. The vectors can include values for various different features. These features may be related to the web content that was examined for clustering purposes at 510, and may also include features that are unrelated to the web content (e.g., domain registration or infrastructure features).

Clusters which meet a threshold level of similarity are forwarded to a clustering engine which examines the clusters to determine whether or not they present a risk to an associated brand owner (540). The clustering engine may also split clusters (e.g., if a cluster is too large or includes both threat actor domains and non-threatening domains) or merge clusters (e.g., if two clusters have similar threat actor information). If a cluster is determined to present a threat to a brand owner, the cluster is stored (545) so that it can be reported to the brand owner. Storing the cluster may involve storing the domain data associated with each of the domains in the cluster, or it may involve storing an indicator of each of the domains so that the associated domain data can be retrieved as needed from the database of domain information. After a cluster has been stored by the clustering engine, the system may examine the domain data to determine which brand owners are associated with the cluster (550). For instance, one of the domains in the cluster may be wellsfargoo.com. The domain data for this domain may include Wells Fargo as an associated brand owner. In other words, wellsfargoo.com may be considered a threat actor with respect to Wells Fargo, so this association is included in the domain data. When the cluster including wellsfargoo.com is examined, Wells Fargo is identified, and the cluster information is reported to Wells Fargo (555) if Wells Fargo is a customer of the system so that protection from this threat actor can be implemented in its systems. The reporting may be pushed to the customer, or the system may simply store the information so that it can be accessed and retrieved by the customer as desired.

It should be noted that the domains in a particular cluster may each be associated with a different brand owner. For example, a cluster may have been generated for domains that each have a common registrant, but these domains may each be associated with a different banking institution (e.g., wellsfargoo.com associated with Wells Fargo, bankofamerican.com associated with Bank of America, etc.). Because each of the domains is associated with the same threat actor, one embodiment reports information for all of the domains in the cluster to each customer that is associated with one of the domains. In another embodiment, the information reported to a particular customer may include only those domains which are associated with that particular customer. While, in this embodiment, the customers do not receive information on domains with which they are not associated, the clustering of the domains across multiple customers/brand owners is nevertheless useful in the identification of the corresponding threat actors.

At 520, the domain data is examined again, this time with respect to the registration information that is associated with the domains. In one embodiment, the domain data that is examined at this step does not include domains that were clustered together at step 510, passed a confidence check at 515, and were forwarded to the clustering engine at 540—only data for the remaining domains is examined. Clusters are again formed at step 520, but the clustering is based on domain registration information instead of web content. For example, if domains have the same email address for the domain registrant, or they were registered by the same domain registrar, the domains may be clustered together. Again, after the clusters are formed (525), a confidence check is performed to ensure that the clusters meet a threshold level of similarity (525). The confidence check may use the same features, feature vectors and threshold as the confidence check at 515, or it may use different features and/or feature vectors and/or threshold similarity level. If a cluster meets this threshold, the cluster is forwarded to the clustering engine, which determines whether the cluster presents a threat to a brand owner (540). It should be noted that the clustering engine operations, storage of clusters and reporting of cluster information to customers may be performed as the clusters are generated and passed to the clustering engine, or the clusters may be processed in batches that may include clusters generated based on web page content, domain registration information, and/or domain infrastructure information.

At 530, the domain data is examined for a third time. At this step, the data is examined with respect to the domain infrastructure information. For instance, the domains may be clustered based on their respective IP addresses. In this embodiment, the domain data that is examined at this step does not include domains that were clustered together at steps 510 or 520, passed the corresponding confidence checks (515, 525), and were forwarded to the clustering engine at 540. Only data for domains that were not previously clustered and forwarded to the clustering engine are examined. Clusters formed at step 530 undergo a confidence check (which may be the same as, or different from the confidence checks at steps 515 and 525) to ensure that the clusters meet a threshold level of similarity (535). If a cluster meets this threshold, the cluster is forwarded to the clustering engine, which determines whether the cluster presents a threat to a brand owner. Domains that have not been clustered based on web page content, domain registration information, or domain infrastructure information are "dropped" (560). In other words, they are not stored for reporting to customers.

While the exemplary embodiment of the serial workflow illustrated in FIG. 5 clusters domains based on web content first, then domain registration information second, and domain infrastructure third, alternative embodiments may perform these examination and clustering operations in a different order. For example, the system may be configured to examine the domain data and cluster the domains based on domain registration information first, then web content second, and domain infrastructure third, or domain infrastructure first, then web content information second, and domain registration third.

Referring to FIG. 6, a flow diagram illustrating a parallel workflow in accordance with one embodiment is shown. Initially, domain data associated with a set of domains is provided to the system (605). This is the same data that is provided to the serial workflow of FIG. 5, and may include information such as domain registration information, domain infrastructure information, and actual content from webpages associated with the respective domains. In this workflow, the full domain data is examined in parallel with respect to web content, domain registration information, and domain infrastructure information and domain clusters are generated based on each of these three types of information. Thus, in this workflow, each domain that is included in the database of domain data is considered with respect to each of the three types of information. By contrast, in the serial workflow of FIG. 5, as each domain is included in a cluster based on a particular type of information, it is removed from consideration for clustering based on the other types of information. For instance, if a domain is included in a cluster at step 505 based on web content, that domain will not be considered for clustering in steps 515 or 525 based on domain registration information and infrastructure information, respectively. Accordingly, the clusters generated by the serial workflow of FIG. 5 will include no more than one occurrence of each domain, while the parallel workflow of FIG. 6 may include a particular domain in up to three different clusters (one for each type of information).

The clustering steps (610, 620, 630) are performed in the same manner as corresponding steps (510, 520, 530) of FIG. 5, with being clustered based on their web content, domain registration information, and infrastructure information, respectively. Each of the clusters generated in steps 610, 620 and 630 undergoes a corresponding confidence check (615, 625, 635). The confidence check may comprise the same statistical analysis of the clusters as described above in connection with FIG. 5. Clusters that are generated and pass the corresponding confidence checks are forwarded to the clustering engine for a determination of whether they present a risk to an associated brand owner (640). As in the serial workflow the clustering engine may also be configured to split clusters or merge clusters based on suitable criteria. If a cluster is determined to present a threat to a brand owner, the cluster is stored (645) so that the brand owner can be identified (650) and the cluster can be reported to the brand owner (655). If the cluster is determined not to present a threat, it is dropped (660).

In one embodiment, the treat analysis system may include both the serial workflow of FIG. 5 and the parallel workflow of FIG. 6. As noted above, the clusters generated by the two workflows may be different because the serial workflow removes domains from the pool of data under consideration as they are clustered, while the parallel workflow does not. The resulting clusters, however, may be examined in the same way by the clustering engine, stored, and reported to customers in the manner. Consequently, while the clustering operations of the two workflows are separate, the workflows may both forward their respective clusters to the same clustering engine, so steps 540, 545 and 550 may be common in this embodiment with steps 640, 645 and 650.

Figure 7:
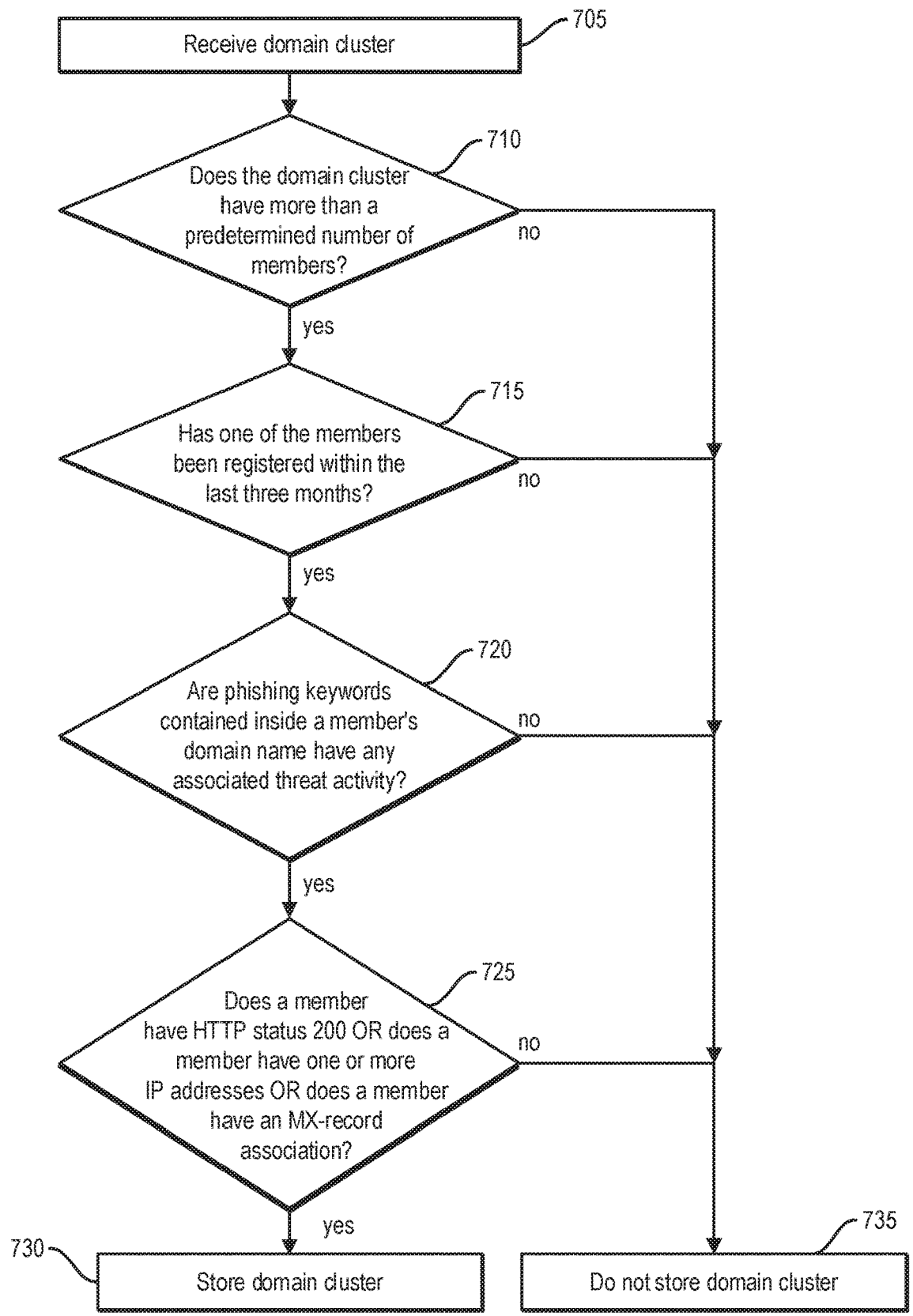
FIG. 7 is a flow diagram illustrating an exemplary method for determining whether a domain cluster is associated with a threat actor in accordance with one embodiment.

As noted above, the clustering engine is configured to determine whether a cluster generated in one of the workflows represents a threat actor. Referring to FIG. 7, a process for making this determination in one embodiment is shown. In this example, a cluster is received by the clustering engine (705). At 710, the clustering engine determines whether the domain cluster has more than a predetermined number (e.g., three) of members (domains included in the cluster). If not, the cluster is not stored (735). If the domain cluster has more than the predetermined number of members, the clustering engine determines whether one of the members of the cluster has been registered within the last three months (715). If not, the cluster is not stored (735). If one of the members was registered within the last three months, the clustering engine determines whether either: phishing keywords are contained inside the domain name of one of the members of the cluster; or the domain name of one of the members has any associated threat activity (720). If neither of these conditions is true, the cluster is not stored (735). If either of the conditions is true, the clustering engine determines whether: one of the members has HTTP status 200; or one of the members has one or more IP addresses; or one of the members has an mail exchanger record (MX-record) association (725). If none of these conditions is true, the cluster is not stored (735). If any one of the conditions is true, the clustering engine stores the cluster (730).

As noted above, domain data associated with various domains is examined to identify threat actors, and is presented to customers when threat actors associated with those customers are identified. Referring to FIGS. 8A-8C, several examples of domain data are provided. Each of these figures depicts domain data for a subset of domains as it might be presented to a customer following identification of a threat actor. Each of the figures depicts the records which include fields such as the domain name (810), domain registration information (registrant email 825 and registrar name 830), domain infrastructure information (IP ASN 815 and DNS IP address 820), web content (GA tracker ID 835), and a brand with which the domain is associated (seed 805). It can be seen that some of the fields for the records may be empty.

FIG. 8A depicts domain data in which the domains have been clustered together based on a common registrant email. The records are each associated with ourbank.com, as they present a threat to this brand. FIG. 8B depicts domain data in which the domains have been clustered together based on common infrastructure information (IP ASN and DNS IP address), as well as a common registrant. In this case, several of the domains are associated with ourbank.com, while one is associated with usabank.com. The domain data for the cluster may therefore be presented, in whole or in part, to customers owning both of these brands. FIG. 8C depicts domain data in which the domains have been clustered based on a common registrant. The records are each associated with nationalbank.com, and would be presented to the customer that owns this brand.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the present disclosure should be determined by the following claims and their legal equivalents.

What is claimed is:

1. A threat actor identification system comprising:
   a computer embodying a threat actor identification system, the computer comprising at least one processor and at least one non-transitory computer-readable medium storing instructions translatable by the at least one processor to perform:
      obtaining domain data from one or more data sources that are communicatively connected to the computer by a network,
      wherein the domain data includes information associated with each of a plurality of domains,
      wherein the domain data for each domain identifies at least one corresponding brand owner with which the domain is associated,
      wherein the domain data for each domain includes one or more of the group consisting of: web page content of the domain, domain registration data for the domain, and infrastructure data for the domain;
      examining the obtained domain data;
      generating, based on the examination of the obtained domain data, one or more domain clusters,
      wherein each domain duster includes a corresponding subset of the domains in the plurality of domains,
      wherein each domain duster is determined based on computed similarities with others of the plurality of domains in the subset;
      determining, for each of the generated domain dusters, whether the domain duster is associated with a threat actor;
      identifying, for each of the generated domain dusters that is associated with a threat actor, one or more brand owners associated with the threat actor;
      providing, for each of the generated domain dusters that is associated with a threat actor, an indication of the threat actor to one or more client devices of the one or more brand owners associated with the threat actor.

2. The system of claim 1, wherein generating the one or more domain clusters based on the examination of the obtained domain data comprises:
   examining web page content for the plurality of domains, determining web page content similarity values indicative of similarities between individual ones of the plurality of domains, and generating domain clusters based on the web page content similarity values;
   examining domain registration data for the plurality of domains, determining domain registration data similarity values indicative of similarities between individual ones of the plurality of domains, and generating domain clusters based on the domain registration data similarity values;
   examining infrastructure data for the plurality of domains, determining infrastructure data similarity values indicative of similarities between individual ones of the plurality of domains, and generating domain clusters based on the infrastructure data similarity values.

3. The system of claim 2, wherein generating the one or more domain clusters based on the examination of the obtained domain data comprises two separate clustering processes,
   wherein in a first, serial one of the clustering processes, the following are performed serially:
      web page content for each of the plurality of domains is examined and domain clusters generated based on the web page content similarity values are forwarded to a clustering engine which determines whether the domain clusters are associated with corresponding threat actors, then
      domain registration data for remaining ones of the plurality of domains are examined and domain clusters generated based on the domain registration data similarity values are forwarded to the clustering engine which determines whether the domain clusters are associated with corresponding threat actors, then
      infrastructure data for remaining ones of the plurality of domains are examined and domain clusters generated based on the infrastructure data similarity values are forwarded to the clustering engine which determines whether the domain clusters are associated with corresponding threat actors;
   wherein in a second, parallel one of the clustering processes, the following are performed in parallel:
      web page content for each of the plurality of domains is examined and domain clusters generated based on the web page content similarity values are forwarded to a clustering engine which determines whether the domain clusters are associated with corresponding threat actors,
      domain registration data for each of the plurality of domains are examined and domain clusters generated based on the domain registration data similarity values are forwarded to the clustering engine which determines whether the domain clusters are associated with corresponding threat actors,
      infrastructure data for each of the plurality of domains are examined and domain clusters generated based on the infrastructure data similarity values are forwarded to the clustering engine which determines whether the domain clusters are associated with corresponding threat actors.

4. The system of claim 1, wherein determining whether the domain cluster is associated with a threat actor comprises:
if
the domain cluster has more than a predetermined number of members, and
one of the members has been registered within the last three months, and
if phishing keywords are contained inside a domain name of one of the members or the domain name of one of the members has any associated threat activity, and
if one of the members has HTTP status 200 or one of the members has one or more IP addresses or one of the members has an MX-record association
then the domain cluster is determined to be associated with a threat actor and is stored;
otherwise, the domain cluster is determined not to be associated with a threat actor and is not stored.

5. The system of claim 1, wherein identifying the one or more brand owners associated with the threat actor comprises: identifying the members of the domain cluster associated with the threat actor; identifying, for each of the members of the domain cluster, one or more brand owners associated with the member.

6. The system of claim 1, wherein providing the indication of the threat actor to the one or more client devices of the one or more brand owners associated with the threat actor comprises: for each of the one or more brand owners associated with the threat actor, providing domain data for one or more of the members of the domain cluster associated with the threat actor, wherein the domain data includes one or more of: web page content of the member; domain registration data for the member; and infrastructure data for the member.

7. A method for identifying threat actors using domain data, the method comprising:
obtaining domain data from one or more data sources that are communicatively connected to the computer by a network,
wherein the domain data includes information associated with each of a plurality of domains,
wherein the domain data for each domain identifies at least one corresponding brand owner with which the domain is associated,
wherein the domain data for each domain includes one or more of the group consisting of: web page content of the domain, domain registration data for the domain, and infrastructure data for the domain;
examining the obtained domain data;
generating, based on the examination of the obtained domain data, one or more domain clusters,
wherein each domain cluster includes a corresponding subset of the domains in the plurality of domains,
wherein each domain duster is determined based on computed similarities with others of the plurality of domains in the subset;
determining, for each of the generated domain clusters, whether the domain cluster is associated with a threat actor;
identifying, for each of the generated domain clusters that is associated with a threat actor, one or more brand owners associated with the threat actor;
providing, for each of the generated domain clusters that is associated with a threat actor, an indication of the threat actor to one or more client devices of the one or more brand owners associated with the threat actor.

8. The method of claim 7, wherein generating the one or more domain clusters based on the examination of the obtained domain data comprises:
examining web page content for the plurality of domains, determining web page content similarity values indicative of similarities between individual ones of the plurality of domains, and domain clusters including ones of the plurality of domains are generated based on the web page content similarity values;
examining domain registration data for the plurality of domains, determining domain registration data similarity values indicative of similarities between individual ones of the plurality of domains, and domain clusters including ones of the plurality of domains are generated based on the domain registration data similarity values;
examining infrastructure data for the plurality of domains, determining infrastructure data similarity values indicative of similarities between individual ones of the plurality of domains, and domain clusters including ones of the plurality of domains are generated based on the infrastructure data similarity values.

9. The method of claim 8, wherein generating the one or more domain clusters based on the examination of the obtained domain data comprises two separate clustering processes,
wherein in a first, serial one of the clustering processes, the following are performed serially:
web page content for each of the plurality of domains is examined and domain clusters generated based on the web page content similarity values are forwarded to a clustering engine which determines whether the domain clusters are associated with corresponding threat actors, then
domain registration data for remaining ones of the plurality of domains are examined and domain clusters generated based on the domain registration data similarity values are forwarded to the clustering engine which determines whether the domain clusters are associated with corresponding threat actors, then
infrastructure data for remaining ones of the plurality of domains are examined and domain clusters generated based on the infrastructure data similarity values are forwarded to the clustering engine which determines whether the domain clusters are associated with corresponding threat actors;
wherein in a second, parallel one of the clustering processes, the following are performed in parallel:
web page content for each of the plurality of domains is examined and domain clusters generated based on the web page content similarity values are forwarded to a clustering engine which determines whether the domain clusters are associated with corresponding threat actors,
domain registration data for each of the plurality of domains are examined and domain clusters generated based on the domain registration data similarity values are forwarded to the clustering engine which determines whether the domain clusters are associated with corresponding threat actors,
infrastructure data for each of the plurality of domains are examined and domain clusters generated based on the infrastructure data similarity values are forwarded to the clustering engine which determines whether the domain clusters are associated with corresponding threat actors.

10. The method of claim 7, wherein determining whether the domain cluster is associated with a threat actor comprises:
if
the domain cluster has more than a predetermined number of members, and
one of the members has been registered within the last three months, and
if phishing keywords are contained inside a domain name of one of the members or the domain name of one of the members has any associated threat activity, and
if one of the members has HTTP status 200 or one of the members has one or more IP addresses or one of the members has an MX-record association
then the domain cluster is determined to be associated with a threat actor and is stored;
otherwise, the domain cluster is determined not to be associated with a threat actor and is not stored.

11. The method of claim 7, wherein identifying the one or more brand owners associated with the threat actor comprises: identifying the members of the domain cluster associated with the threat actor; identifying, for each of the members of the domain cluster, one or more brand owners associated with the member.

12. The method of claim 7, wherein providing the indication of the threat actor to the one or more client devices of the one or more brand owners associated with the threat actor comprises: for each of the one or more brand owners associated with the threat actor, providing domain data for one or more of the members of the domain cluster associated with the threat actor, wherein the domain data includes one or more of: web page content of the member; domain registration data for the member; and infrastructure data for the member.

13. A computer program product comprising at least one non-transitory computer-readable medium storing instructions translatable by at least one processor to perform:
obtaining domain data from one or more data sources that are communicatively connected to the computer by a network,
wherein the domain data includes information associated with each of a plurality of domains;
wherein the domain data for each domain identifies at least one corresponding brand owner with which the domain is associated,
wherein the domain data for each domain includes one or more of the group consisting of: web page content of the domain, domain
registration data for the domain, and infrastructure data for the domain;
examining the obtained domain data;
generating, based on the examination of the obtained domain data, one or more domain dusters,
wherein each domain cluster includes a corresponding subset of the domains in the plurality of domains,
wherein each domain duster is determined based on computed similarities with others of the plurality of domains in the subset;
determining, for each of the generated domain dusters, whether the domain cluster is associated with a threat actor;
identifying, for each of the generated domain dusters that is associated with a threat actor, one or more brand owners associated with the threat actor:
providing, for each of the generated domain dusters that is associated with a threat actor, an indication of the threat actor to one or more client devices of the one or more brand owners associated with the threat actor.

14. The computer program product of claim 13, wherein generating the one or more domain clusters based on the examination of the obtained domain data comprises:
examining web page content for the plurality of domains, determining web page content similarity values indicative of similarities between individual ones of the plurality of domains, and domain clusters including ones of the plurality of domains are generated based on the web page content similarity values;
examining domain registration data for the plurality of domains, determining domain registration data similarity values indicative of similarities between individual ones of the plurality of domains, and domain clusters including ones of the plurality of domains are generated based on the domain registration data similarity values;
examining infrastructure data for the plurality of domains, determining infrastructure data similarity values indicative of similarities between individual ones of the plurality of domains, and domain clusters including ones of the plurality of domains are generated based on the infrastructure data similarity values.

15. The computer program product of claim 14, wherein generating the one or more domain clusters based on the examination of the obtained domain data comprises two separate clustering processes,
wherein in a first, serial one of the clustering processes, the following are performed serially:
web page content for each of the plurality of domains is examined and domain clusters generated based on the web page content similarity values are forwarded to a clustering engine which determines whether the domain clusters are associated with corresponding threat actors, then
domain registration data for remaining ones of the plurality of domains are examined and domain clusters generated based on the domain registration data similarity values are forwarded to the clustering engine which determines whether the domain clusters are associated with corresponding threat actors, then
infrastructure data for remaining ones of the plurality of domains are examined and domain clusters generated based on the infrastructure data similarity values are forwarded to the clustering engine which determines whether the domain clusters are associated with corresponding threat actors;
wherein in a second, parallel one of the clustering processes, the following are performed in parallel:
web page content for each of the plurality of domains is examined and domain clusters generated based on the web page content similarity values are forwarded to a clustering engine which determines whether the domain clusters are associated with corresponding threat actors,
domain registration data for each of the plurality of domains are examined and domain clusters generated based on the domain registration data similarity values are forwarded to the clustering engine which determines whether the domain clusters are associated with corresponding threat actors, infrastructure data for each of the plurality of domains are examined and domain clusters generated based on the infrastructure data similarity values are forwarded to the clustering engine which determines whether the domain clusters are associated with corresponding threat actors.

16. The computer program product of claim 13, wherein determining whether the domain cluster is associated with a threat actor comprises:
if
the domain cluster has more than a predetermined number of members, and
one of the members has been registered within the last three months, and
if phishing keywords are contained inside a domain name of one of the members or the domain name of one of the members has any associated threat activity, and
if one of the members has HTTP status 200 or one of the members has one or more IP addresses or one of the members has an MX-record association
then the domain cluster is determined to be associated with a threat actor and is stored;
otherwise, the domain cluster is determined not to be associated with a threat actor and is not stored.

17. The computer program product of claim 13, wherein identifying the one or more brand owners associated with the threat actor comprises: identifying the members of the domain cluster associated with the threat actor; identifying, for each of the members of the domain cluster, one or more brand owners associated with the member.

18. The computer program product of claim 13, wherein providing the indication of the threat actor to the one or more client devices of the one or more brand owners associated with the threat actor comprises: for each of the one or more brand owners associated with the threat actor, providing domain data for one or more of the members of the domain cluster associated with the threat actor, wherein the domain data includes one or more of: web page content of the member; domain registration data for the member; and infrastructure data for the member.

* * * * *

UNITED STATES PATENT AND TRADEMARK OFFICE
CERTIFICATE OF CORRECTION

PATENT NO. : 10,965,701 B2  
APPLICATION NO. : 16/247182  
DATED : March 30, 2021  
INVENTOR(S) : Gaurav Mitesh Dalal, Hung-Jen Chang and Ali Mesdaq Page 1 of 1

It is certified that error appears in the above-identified patent and that said Letters Patent is hereby corrected as shown below:

Claim 1:  
Column 17, Line 57, replace "duster" with "cluster"  
Column 17, Line 59, replace "duster" with "cluster"  
Column 17, Line 62, replace "dusters" with "clusters"  
Column 17, Line 63, replace "duster" with "cluster"  
Column 17, Line 65, replace "dusters" with "clusters"

Claim 7:  
Column 19, Line 59, replace "duster" with "cluster"

Claim 13:  
Column 21, Line 48, replace ";" with ","  
Column 21, Line 59, replace "dusters" with "clusters"  
Column 21, Line 62, replace "duster" with "cluster"  
Column 21, Line 65, replace "dusters" with "clusters"  
Column 22, Line 1, replace "duster" with "cluster"  
Column 22, Line 3, replace ":" with ";"  
Column 22, Line 4, replace "dusters" with "clusters"

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*